United States Patent [19]

Schectman

[11] Patent Number: 5,647,622

[45] Date of Patent: Jul. 15, 1997

[54] FLEXIBLE REACH TOOL

[76] Inventor: Leonard A. Schectman, 3742 Boanza Cir., Lantana, Fla. 33462

[21] Appl. No.: 394,754

[22] Filed: Feb. 27, 1995

[51] Int. Cl.$^6$ .................................................. B25J 1/02
[52] U.S. Cl. .............................. 294/19.1; 81/177.6
[58] Field of Search ............................ 294/19.1, 22–25, 294/66.2, 100, 111, 115; 81/53.11, 53.12, 177.6, 177.7; 414/732, 739; 623/64; 901/19, 21, 30, 31, 41

[56] References Cited

U.S. PATENT DOCUMENTS

| | | | |
|---|---|---|---|
| 3,247,978 | 4/1966 | Neumeier | 901/21 X |
| 4,033,618 | 7/1977 | Lamb | 294/19.1 |
| 4,253,697 | 3/1981 | Acosta | 294/19.1 X |
| 4,374,600 | 2/1983 | van Zelm | 294/19.1 |
| 4,483,562 | 11/1984 | Schoolman | 294/19.1 |

FOREIGN PATENT DOCUMENTS

| | | | |
|---|---|---|---|
| 3420834 | 12/1985 | Germany | 294/19.1 |

*Primary Examiner*—Johnny D. Cherry
*Attorney, Agent, or Firm*—Malin, Haley, DiMaggio & Crosby

[57] ABSTRACT

A flexible reach tool or tool accessory for providing a small, hand-held device that can position a tool or tool accessory into a small, normally inaccessible area for performing a mechanical function or for observing a particular area of a device that includes a rigid arm, a flexible positionable arm and a manipulatable tool connected to one end of the flexible arm. The tool may include plier jaws, a screw driver, powered grinding wheel, or accessories such as a mirror and light for illuminated observation.

10 Claims, 5 Drawing Sheets

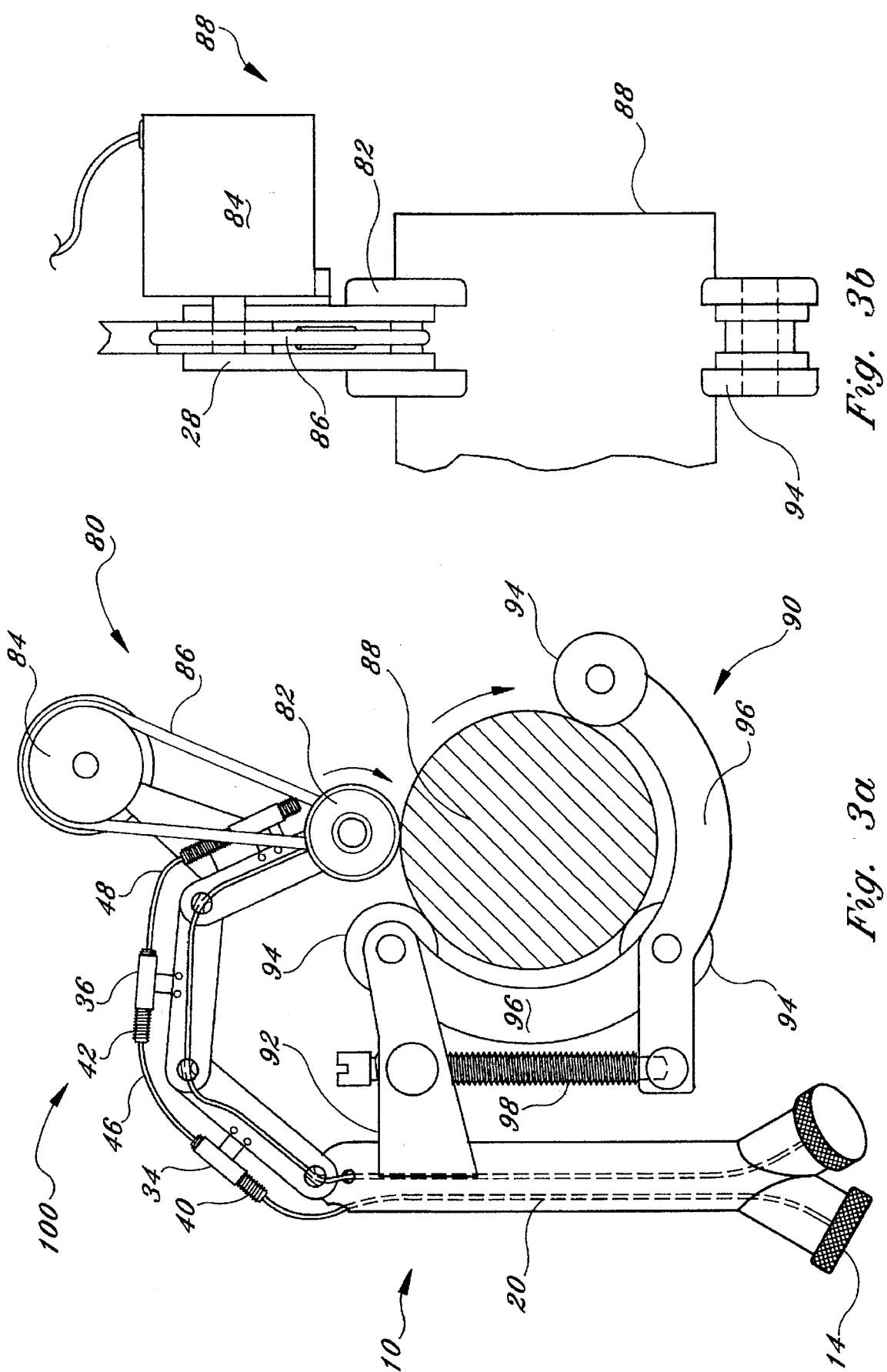

FLEXIBLE REACH TOOL

BACKGROUND OF THE INVENTION

1. Field of the Invention

This invention relates to a tool manipulating apparatus capable of selectively flexing, and having a tool, or tool accessory, mounted at the end of a hand-manipulatable, flexible arm that can be user controlled to selectively bend incrementally away from a straight, longitudinal axis to allow the user to perform an action with the tool. The invention specifically relates to an extending flexible manipulating arm, having an end-mounted tool or tool accessory, that simulates the bending movement of an elephant's trunk, whereby movement is effected by a threaded screw mechanism that allows the arm to be bent relative to a straight, longitudinal axis to manipulate the position of the tool or tool accessories away from the longitudinal axis in a bending action that can be greater than 90 degrees to allow insertion or use of the tool or tool accessory in an area that is typically unaccessible for either human fingers, hands, or conventional hand-held tools in order to perform some mechanical operation such as turning a bolt or screw.

2. Description of the Prior Art

The use of manually-actuated tools such as pliers, wrenches, and screwdrivers is well known in the prior art. One problem often encountered with tools such as pliers or screwdrivers is that the particular mechanical device such as a bolt head, nut, or screw is mounted in an area of limited access that prevents direct access or direct use of a conventional tool. A classic example is found working on a modern day automobile engine which typically has so many components and parts consuming the free area surrounding the engine, in the engine compartment, that certain mechanical work on an automobile engine is very difficult to perform without specialized tools. In some instances, the automobile manufacturer must make a special tool just to access a particular bolt or screw in a particular car engine. Other examples are commonly found in home construction with home appliances and other areas that have remotely located screws or nuts that are inaccessible.

A corollary to these problems involves the need for a manipulatable device that can be moved relative to a longitudinal axis that is straight, in angular fashion, to allow viewing of typically inaccessible areas in machinery for trouble-shooting and inspection purposes. The present invention provides not only for remotely actuated tools, but can allow for a remotely actuated mirror that allows the mirror surface to be moved about in a plane while at the same time being manipulatable into inaccessible areas for viewing.

In addition, a combination of such devices could be used in accordance with the present invention such as, for example, a light for illuminating an inaccessible area, and a mirror to view, or a tool necessary to actuate a mechanical device remotely in an inaccessible area. Light may be transmitted by flexible fiber optic cable, and, when combined with a mirror, function to reflect light to remote inaccessible areas for assisting in visual inspection and/or illumination of a work space.

U.S. Pat. No. 5,326,369, issued to the instant inventor, discloses the use of a flexible actuating screw to manipulate robotic fingers for use in robotics wherein a motor actuated screw device is used for the transmission of torque over articulating surfaces for simulating the movement of a human hand. The '369 Patent is hereby incorporated by reference as if fully set forth herein. The '369 Patent does not contemplate, however, the manipulation of tools, tool accessories, or other end effectors. The present invention overcomes the problems cited in the prior art by providing a flexible reach device that can be manually manipulated to allow a tool or tool accessory to be inserted and manipulated into what would normally be an inaccessible location for performing a mechanical action such as tightening or loosening a screw, tightening or removing a nut, illuminating an area for observation purposes, or manipulating a grinding wheel, in a very simple mechanically or manually-actuated device.

SUMMARY OF THE INVENTION

A flexible reach tool or tool accessory device having a means for attaching a tool or tool accessory (hereinafter collectively "tool") at an end remote from a user for manually manipulating the tool into a typically inaccessible enclosure or small area, with the device also being adjustable, and comprising: a rigid, straight arm and a flexible arm connected at one end to the rigid arm; a mechanical actuator, such as an electric, pneumatic, or manual power source, that can move the free end of the flexible arm into a plurality of positions beginning with a position along the longitudinal axis of the rigid arm to a series of incremental positions at least so that the free end of the flexible arm attains a 90 degree position relative to the rigid arm; and, means for attaching and manipulating a tool at the end of said arm for performing a desired task in confined spaces.

For example, a tool, such as a pair of pliers, is attached to the free end of the flexible arm and manual actuators are used to affect arm flexing and manipulate the attached tool such as to allow closing and opening of the plier jaws remotely by the remote actuator. An additional manual actuator may be used to enable rotation of the end mounted tool about a longitudinal axis.

The pliers or gripping jaws can also be replaced by tweezers, a screwdriver that can be remotely actuated, or a mirror, the plane of which can be moved relative to the end face of the flexible arm, and a light that can be directionally moved for illumination purposes, or any desired combination of tools and/or tool accessories.

To accomplish incremental movement of the flexible arm, in one embodiment, a rigid cable, or rigid metal elongated member, is attached at one end to the rigid arm and can be rotated. The cable is affixed at the opposite end to a flexible screw that includes a rigid plurality of screw apertures that are threaded and connected at predetermined locations along the flexible arm rigidly, each of them having a male threaded screw mounted therein for rotating in either direction and a plurality of elongated rigid pieces connecting each end of the male screw members together to function as a single unit so that as the actuator is rotated in either direction, the male screw members will rotate, causing the threaded apertures to move longitudinally along each male screw member, all of which moves the flexible arm in a first or second direction, depending on the rotation of the actuating member.

A tool is rotatably fixed to the free end of the flexible arm and also includes an actuating cable or rod which is capable of linear or rotational movement for causing, for example, plier jaws to open or close, depending on the direction of rotation or linear movement. An additional actuating cable may be used to enable axial rotation of the end mounted tool.

Using pliers as an example, the present invention can be manipulated by actuating the flexible arm to the necessary angular relationship relative to the rigid arm so that the plier jaws are placed adjacent a nut or bolt head that is to be grasped and moved. Once the tool mounted on the end of the flexible arm has been properly positioned, the first tool actuating mechanism may then be utilized to axially rotate the tool for proper alignment and the second tool actuating mechanism may then be utilized to allow the pliers to grasp the object that is to be manipulated. Other accessories or tools can be used, such as a screwdriver, tweezers, a mirror, a nut driver, a grinding wheel, or a light provided by fiber optics.

Thus, the instant invention provides a flexible reach device having an end mounted tool, the device having linkages capable of rotational and/or linear motion for selectively manipulating the end mounted tool.

It is an object of this invention to provide an improved tool that allows for a flexible reach that is manually actuated to position a tool or tool accessory in a remote, inaccessible location that a conventional hand tool cannot reach.

It is another object of this invention to provide a flexible reach device that includes a rigid portion and a flexible portion, the flexible portion of which can be positioned away from the longitudinal axis of the rigid portion to a desired angular relationship so that a tool or accessory mounted on the free end of the flexible portion can be positioned into an inaccessible area to allow actuation of a mechanical device or illumination or observation of a remote, inaccessible area.

But yet still another object of this invention is to provide a relatively thin, narrow, elongated device having a small cross sectional area that can be easily thrust into typically inaccessible areas that cannot be reached manually with one's fingers or with a conventional tool to provide sufficient room for actuation of a conventional tool such as a screwdriver or pliers, wherein the flexible reach device in accordance with the invention can be used to locate, grasp, and manipulate the mechanical device remotely in inaccessible areas.

In accordance with these and other objects which will become apparent hereinafter, the instant invention will now be described with particular reference to the accompanying drawings.

BRIEF DESCRIPTION OF THE DRAWINGS

FIG. 2b is a partial rear view detailing the tool mounting end of the present invention shown in FIG. 2a.

FIG. 3a is a right side view of the grinding wheel embodiment of the present invention operably connected to a crankshaft.

FIG. 3b is a partial front view of the embodiment depicted in FIG. 3a.

DESCRIPTION OF THE PREFERRED EMBODIMENTS

Figure 1A:
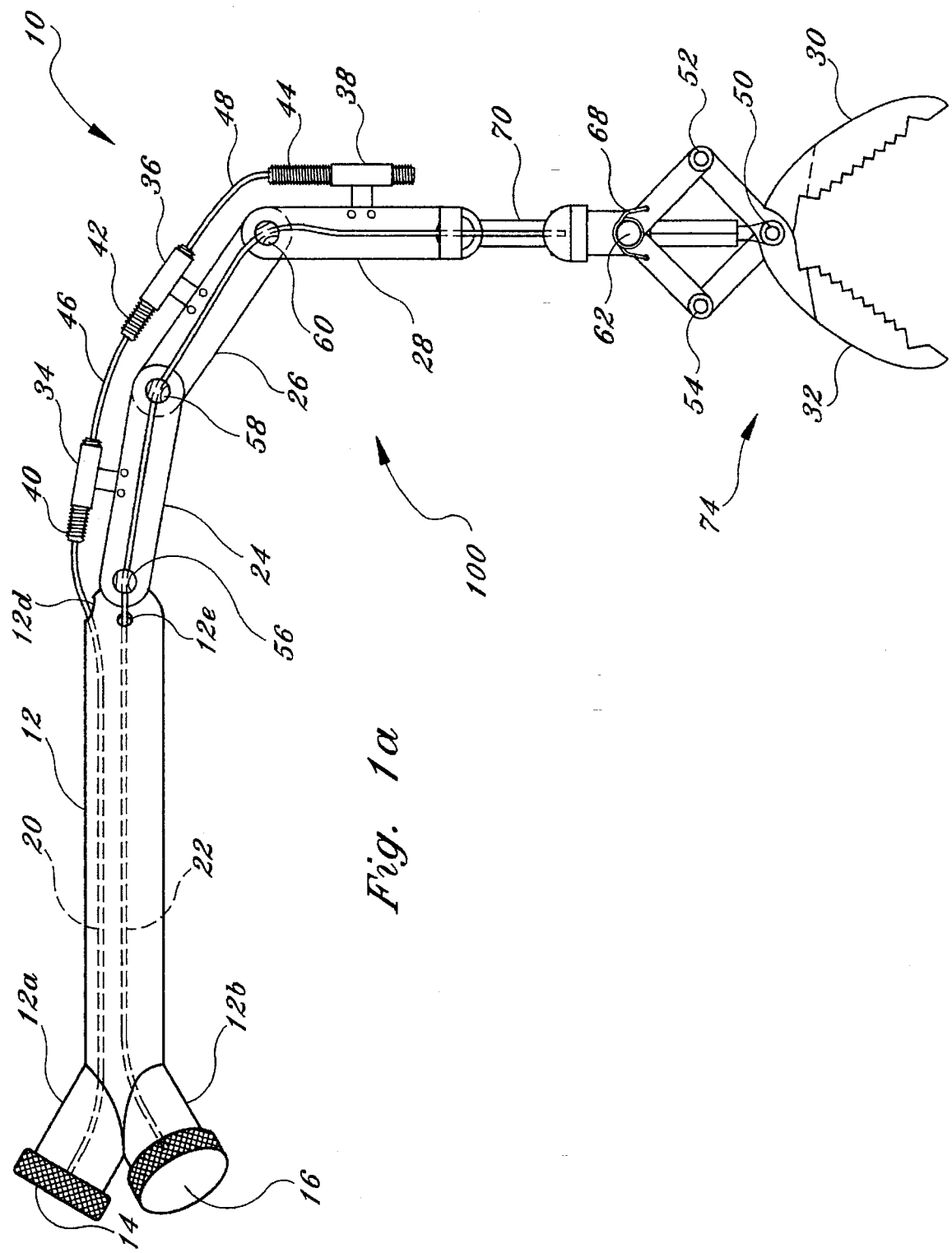
FIG. 1a is a right side view of the present invention with a pair of pliers mounted thereon in the open position and with the flexible portion bent approximately 90 degrees with respect to the rigid portion.

Referring now the drawings, with continuing reference to FIGS. 1a–3b, the present invention is shown, in one embodiment having a pair of pliers attached to the free end of a flexible arm having a means for actuating which may include manual actuation or actuation by a power source such as an electric motor, pneumatic, or hydraulic power source. In the preferred embodiment, manual actuation is contemplated, however, alternate embodiments, incorporating any suitable power source are within the scope of the present invention.

The present invention is shown generally at 10, comprised of a rigid arm 12 that may be a metal tube that has a trifurcated end terminating in tubes 12a and 12b and 12c. A rotatable disk 14 and a grasping means, such as disk 16, are mounted on the tube ends 12a and 12b, respectively, of rigid arm 12 for providing manual actuation means. In addition, a second rotatable disk 18, is mounted on tube end 12c, as best depicted in FIG. 1b for reasons which will soon become apparent. Because of the position of tubes 12a, 12b, and 12c, tube 12c is hidden from view in FIGS. 1a and 1b. Tube 12c can be seen in FIG. 2a, where tube 12b is hidden from view.

Rotatable disk 14 is mechanically affixed to an actuating means 20 such as a cable or rod that runs through the tube and out through an opening 12d in tube 12. The actuating means 20 terminates in a rigid connection to a male threaded member 40 that is threadably mounted within an elongated threaded eye firmly mounted to link 24.

Figure 1B:
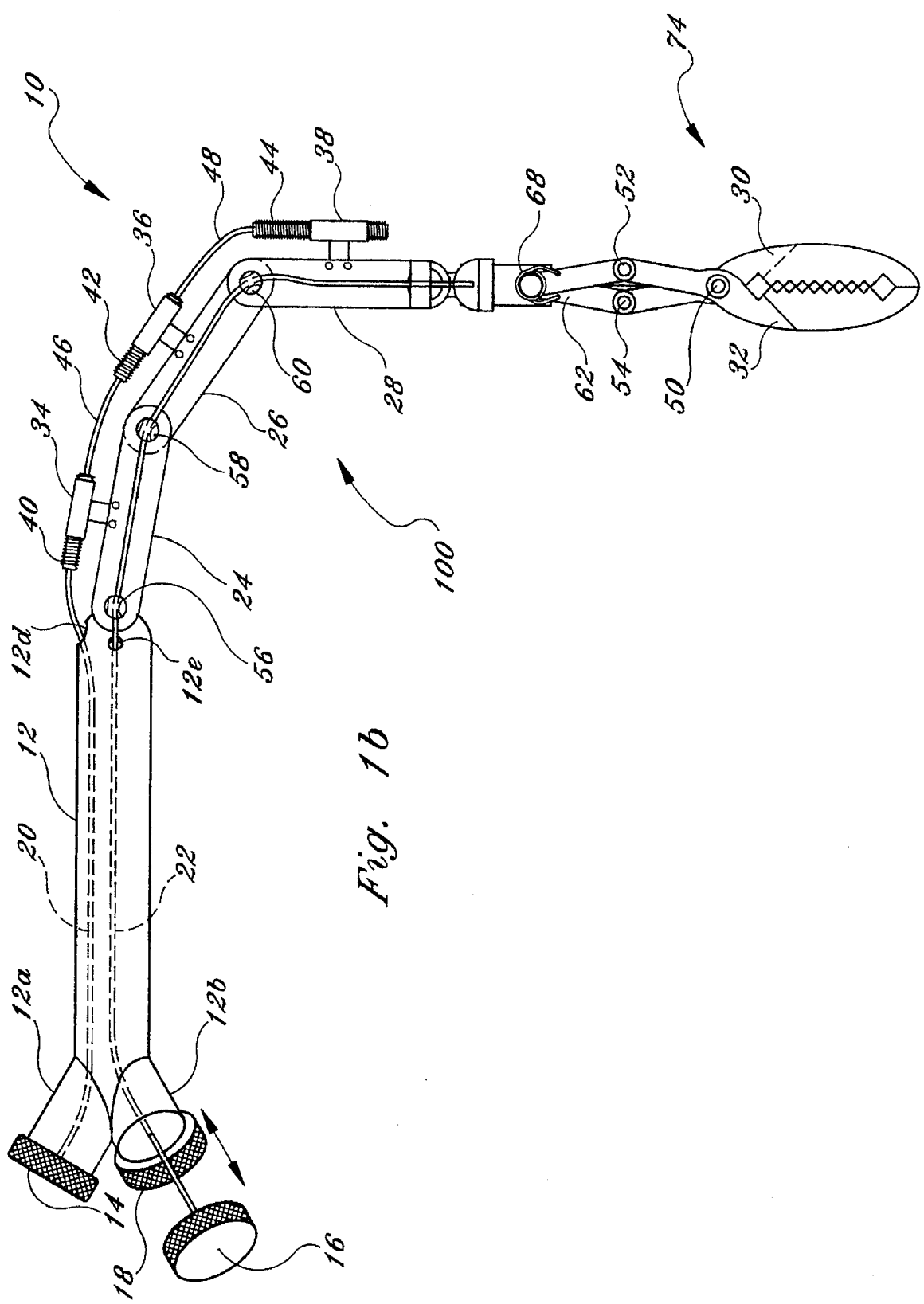
FIG. 1b is a right side view of the present invention with a pair of pliers mounted thereon in the closed position and with the flexible portion bent approximately 90 degrees with respect to the rigid portion.

Grasping disk 16, which is demountably coupled to tube portion 12b, also includes a mechanical cable, rod, or shaft 22 that exits tube 12 at tube opening 12e and is connected to an end mounted tool assembly for allowing linear manipulation of the end mounted tool assembly, as best depicted in FIGS. 1a and 1b.

Figure 2A:
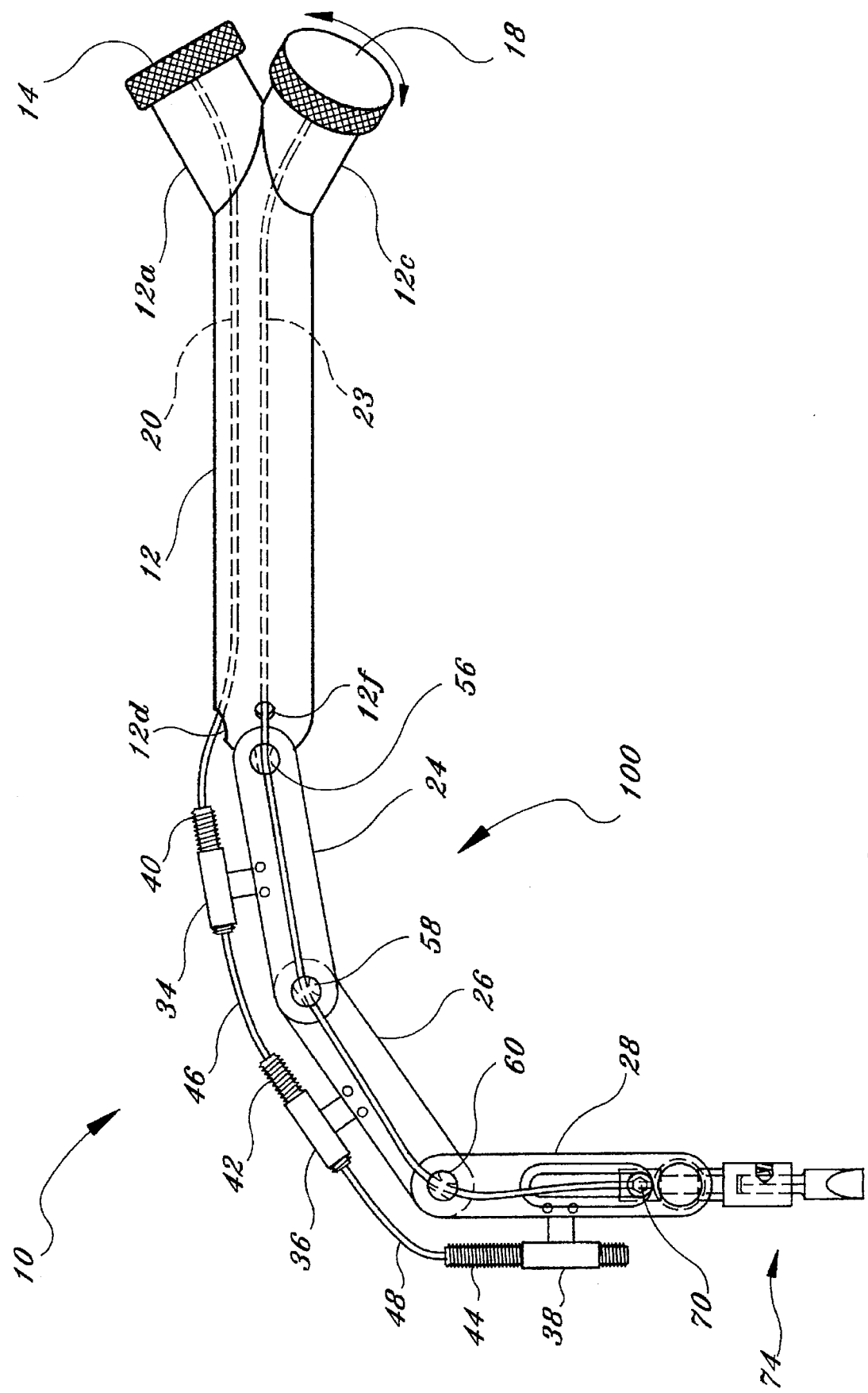
FIG. 2a is a left side view of the present invention with a screw driver mounted thereon and with the flexible portion bent approximately 90 degrees with respect to the rigid portion.
Figure 1C:
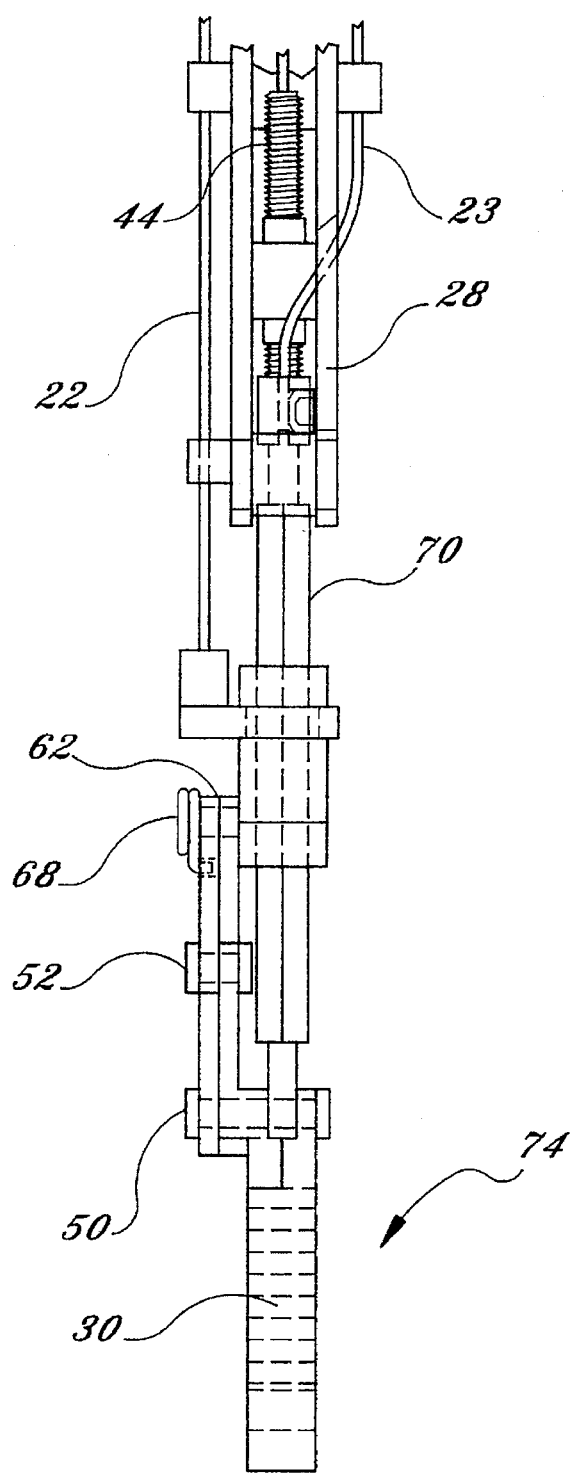
FIG. 1c is a partial front view detailing the tool mounting end of the present invention shown in FIGS. 1a and 1b.
Figure 2B:
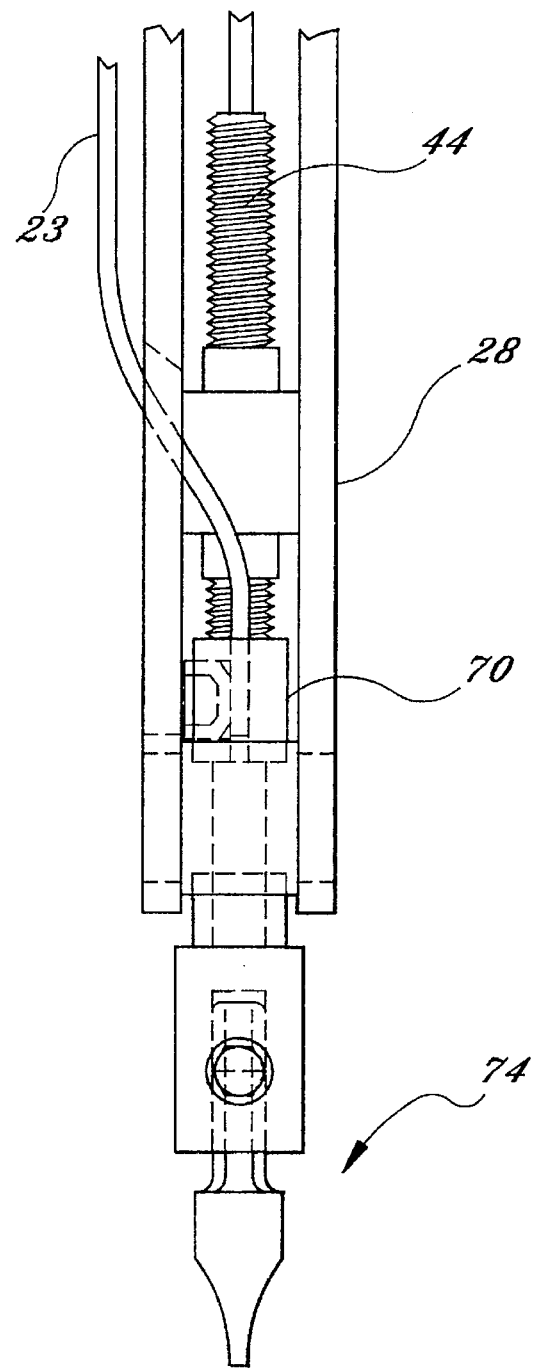

Rotatable disk 18 is mechanically affixed to an actuating means 23 such as a wire or rod that runs through the tube and out through an opening 12f in tube 12. The actuating means 23 terminates in a rigid connection to a rotatable tool mount 70 for allowing rotational manipulation of the end mounted tool, as best depicted in FIGS. 1c, 2a, and 2b.

A flexible arm is attached at one end to one end of the rigid tube 12 by a pivotal joint 56. The flexible arm 100 is made up of a series of rigid arms 24, 26, and 28, which are in effect linkage arms pivotally connected together by hinges 58 and 60.

Rigidly attached to linkage arm 24 is a threaded female fastener or connector 34, having a threaded eye, that includes a male threaded connector 40 mounted therein. A similar female fastener 36 is mounted rigidly to linkage arm 26 and includes a male connector 42 threadably mounted therein for rotational movement. Threaded fastener 38, also having a threaded eye, also contains a male fastener 44 which is threaded for rotational movement therein with the fastener 38 being rigidly connected to linkage arm 28.

Male fasteners 40 and 42 are connected by actuating cable 46, and male fasteners 42 and 44 are connected by actuating cable 48. Therefore, as is now apparent, rotation of disk 14 causes actuating cable 20 to rotate male fastener 40, which in turn causes actuating cable 46 to rotate male fastener 42, which in turn causes actuating cable 48 to rotate male fastener 44. Rotational movement of each of the male fasteners 40, 42, and 44 causes the entire flexible arm 100 to move, depending on the direction of rotation, by virtue of the relative movement between the female connectors 34, 36, and 38, relative to the male fasteners 40, 42, and 44 mounted therein. Thus, by rotating the rotatable disk 14 in a first direction or second direction, the entire flexible arm 100 can be moved from a first position that is within the longitudinal straight axis of rigid tube 12 to a series of incremental positions, resulting in a position shown in FIG. 1 in which the free end of flexible arm 100 is substantially 90 degrees to the longitudinal axis of tube 12. The flexible arm movement is described in more detail in the '369 Patent incorporated fully herein by reference.

In the plier embodiment found in FIGS. 1a, 1b and 1c, linear movement of disk 16, causes shaft 22 to move linearly, which results in the movement of jaws 30 and 32 of the end mounted pliers caused by moving the distance between pivot joint 50 and pivot joint 62, and cooperating pivot joints 52 and 54, causing the plier jaws to either open or close, depending on the direction of movement. In an alternate embodiment, rotation of disk 16 results in linear motion of shaft 22 having the same results. The rotatable shaft 20 is mounted to the flexible arm by a plurality of threaded connectors and eyes at 56, 58, and 60 which are the hinged joints of the linkage arms that contain threaded eyes. An actuating spring 68, which the rotatable shaft works against to open the pliers, is mounted so as to urge the pliers to a closed position.

Similarly, rotation of disk 18, as best seen in FIG. 2a, causes actuating means 23 to rotate which in turn is connected to a rotatable tool mount 70 located at the free end of rigid link member 28. Tool mount 70 is rotatably coupled to rigid link member 28 and is structured for receiving a selected tool demountably coupled therewith such that rotation of disk 18 causes the rotation of tool mount 70 and the mounted tool, shown generally as 74. Accordingly, a user may axially orient the end mounted tool to the desired position by rotation of disk 18.

Therefore, to use the instant invention, a user selects and mounts the desired tool to the tool mount 70 rotatably coupled to rigid linkage member 28, rotates disk 14 until the flexible arm reaches the desired bent configuration, places the end mounted tool 74 adjacent the desired object to be manipulated, rotates disk 18 to rotate the end mounted tool for desired axial alignment, and linearly manipulates the tool, as necessary by applying tension to disk 16 which in turn linearly acts on the end mounted tool, via cable 22, so as to close the pliers in the embodiment depicted in FIGS. 1a and 1b, or bring about other results depending upon the selected tool 74.

In a third embodiment, a powered grinding wheel assembly, generally depicted as 80 in FIGS. 3a and 3b, including a grinding wheel 82 and an electric motor 84 and a driving belt 86, for grinding a damaged automobile engine crankshaft is contemplated. In this embodiment a brace 90 is mounted to arm 12 by a support flange 92. The brace 90 includes a plurality of linked members 96 having a plurality of rollers 94 for engagement with a crankshaft 88. A threaded member 98 cooperates with linkage members 96 and support flange 92 for securely bracing arm 12 to crank shaft 88, which may be accessed while remaining installed in the automobile engine (not shown) by removing the oil pan. Accordingly, after securing the device to a crankshaft, electric motor 84 is activated and grinding wheel 82 may be precisely positioned, for smoothing the shaft, by rotation of disk 14.

As is now apparent, the tool or tool accessory can be selectively replaced with separate tools such as pliers, tweezers, screwdrivers, mirrors or a mirror and light combination, or a grinding wheel. As a result, the end tip of the flexible arm can be manipulated while at the same time providing for mechanical manipulation of the end mounted tool or tool accessory. By the use of the present invention, a tool or tool accessory can be quickly and easily positioned because of the narrow diameter (less than 2 inches) of the entire device which can be manipulated into remote locations that are totally inaccessible normally for either human hands or a normal hand-actuated tool.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A flexible reach tool for positioning and actuating a tool in an inaccessible location, comprising:

a rigid arm having a longitudinal axis, a first end and a second end;

a flexible arm having a first end and a second end, said flexible arm first end pivotally connected to said rigid arm second end;

means connected to said rigid arm and said flexible arm for positioning said flexible arm from a first position, wherein said flexible arm is longitudinally coaxial with the longitudinal axis of said rigid arm, to a plurality of non-axial positions, including a position at least 90 degrees relative to the longitudinal axis of said rigid arm;

said means for positioning including:
      a rotatable disk connected to said rigid arm proximate said first end;
      at least one externally threaded connector;
      means for connecting said rotatable disk to said at least one externally threaded connector;
      at least one internally threaded connector having said at least one externally threaded connector mounted therein, said at least one internally threaded connector mounted on said flexible arm, wherein rotation of said rotatable disk moves said flexible arm from said first position through said plurality of non-axial positions;

a manually-actuated tool mounted to the second end of said flexible arm; and a first means for actuating said tool, connected to said flexible arm and said rigid arm, from a position on said rigid arm, whereby said tool can be selectively actuated in a remote, inaccessible location from said rigid arm.

2. A flexible reach tool as in claim 1, further including a second means for actuating said manually-actuated tool, wherein said second means for actuating said manually-actuated tool includes rotation of said tool about a central axis.

3. A flexible reach tool as in claim 1, wherein said first means for actuating said tool includes linear actuation of said tool.

4. A flexible reach tool as in claim 1, including:

a mirror mounted on the second end of said flexible arm; and means for moving said mirror in different planes relative to said flexible arm.

5. A flexible reach tool as in claim 1, including:

a light mounted on the flexible arm second end.

6. A flexible reach tool as in claim 1, including:

a grinding wheel mounted on the flexible arm second end, and;

means for providing rotational power to said grinding wheel.

7. A flexible reach tool as in claim 1, wherein:

said flexible arm includes at least a first and second rigid linkage arms, each of said linkage arms having a first end and a second end, said first rigid linkage arm first end pivotally connected to said rigid arm second end, said second linkage arm first end pivotally connected to said first linkage arm second end, said tool mounted to said second linkage arm second end;

a plurality of internally threaded connectors one each rigidly attached to one each of said linkage arms;

a plurality of externally threaded connectors one each mounted within one each of said plurality of internally threaded connectors;

means for connecting said plurality of externally threaded connectors together, wherein rotation of said rotatable disk causes said plurality of externally threaded connectors to rotate within said plurality of internally threaded connectors, causing said linkage arms to move, thereby causing said flexible arm to move from said first position through said plurality of non-axial positions.

8. A flexible reach tool as in claim 7, further including a second means for actuating said manually-actuated tool, wherein said second means for actuating said manually-actuated tool includes rotation of said tool about a central axis.

9. A flexible reach tool as in claim 7, wherein said first means for actuating said tool includes linear actuation of said tool.

10. A flexible reach tool as in claim 7, wherein said flexible arm includes a plurality of more than two rigid linkage arms.

* * * * *